(12) United States Patent
Tebby

(10) Patent No.: US 6,402,461 B1
(45) Date of Patent: Jun. 11, 2002

(54) PUMPS

(75) Inventor: Stephen Walker Tebby, Leamington Spa (GB)

(73) Assignee: Concentric Pumps Limited, Birmingham (GB)

( * ) Notice: Subject to any disclaimer, the term of this patent is extended or adjusted under 35 U.S.C. 154(b) by 0 days.

(21) Appl. No.: 09/536,773

(22) Filed: Mar. 28, 2000

(30) Foreign Application Priority Data

Mar. 30, 1999 (GB) .............................................. 9907372

(51) Int. Cl.[7] .......................... F04D 29/12; F04D 29/16
(52) U.S. Cl. ...................... 415/58.2; 415/112; 415/111; 415/113
(58) Field of Search ................................. 415/58.2, 109, 415/111, 112, 168.1, 168.2, 170.1, 171.1, 176, 230, 113

(56) References Cited

U.S. PATENT DOCUMENTS

| | | | | |
|---|---|---|---|---|
| 2,769,390 A | * | 11/1956 | Heimbuch | 415/111 |
| 2,777,395 A | | 1/1957 | Disbrow | 415/112 |
| 3,340,813 A | | 9/1967 | Keyes | 415/109 |
| 3,632,220 A | * | 1/1972 | Lansinger | 415/112 |
| 4,773,823 A | | 9/1988 | Pease | 415/176 |
| 5,156,522 A | | 10/1992 | Tessier | 415/170.1 |
| 5,195,867 A | | 3/1993 | Stirling | 415/111 |
| 5,226,787 A | * | 7/1993 | Freeman | 415/170.1 |
| 5,409,350 A | * | 4/1995 | Mitchell | 415/113 |
| 5,718,436 A | | 2/1998 | Dunford | 277/423 |
| 5,827,041 A | * | 10/1998 | Charhut | 415/111 |

FOREIGN PATENT DOCUMENTS

| | | |
|---|---|---|
| EP | 0 386 315 A1 | 9/1990 |
| EP | 0 484 582 A1 | 5/1992 |
| GB | 1258101 | 12/1971 |
| JP | 61-181621 | 8/1986 |
| WO | WO 97/13071 | 4/1997 |

* cited by examiner

*Primary Examiner*—F. Daniel Lopez
*Assistant Examiner*—Richard Woo
(74) *Attorney, Agent, or Firm*—A. M. (Andy) Arismendi, Jr.; Lundeen & Arismendi, LLP

(57) ABSTRACT

A fluid pump (10) has a body housing (14) a fluid pumping chamber having a rotatable pumping member (16), a drive shaft (12) which passes through an aperture in the body into the pumping chamber to effect rotation of the pumping member in use, a seal (18) between the pump body and drive shaft to inhibit fluid moving along the shaft out of the pumping chamber, and a dividing shroud (32) operably located between the seal and the rotatable pumping member to divide the fluid pumping chamber (30) between the seal and the rotatable pumping member.

22 Claims, 3 Drawing Sheets

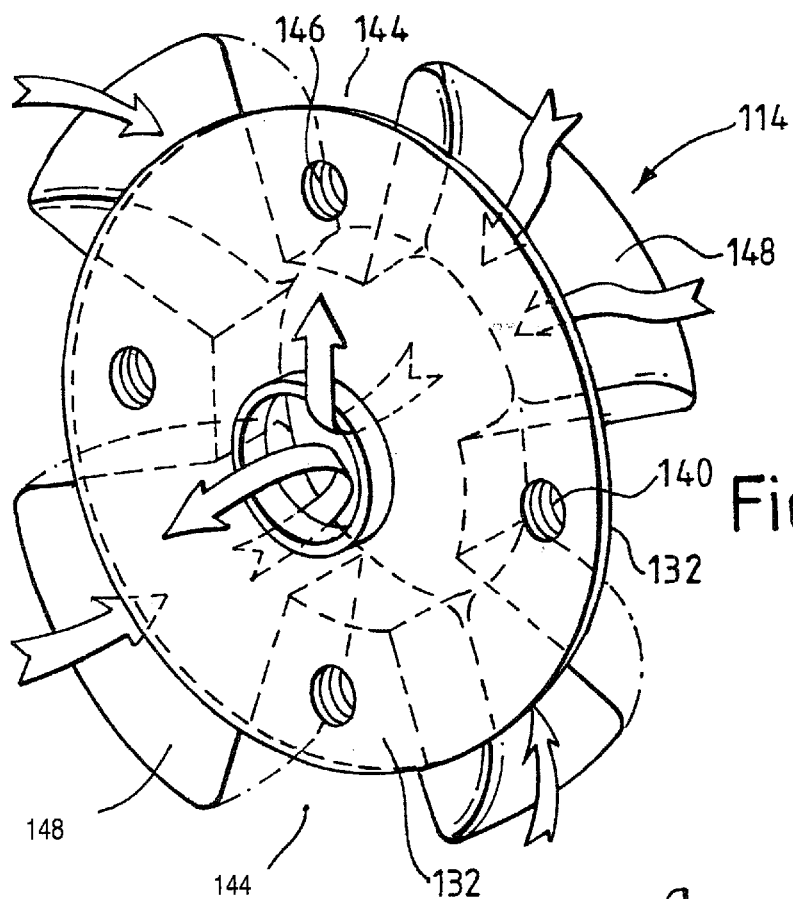
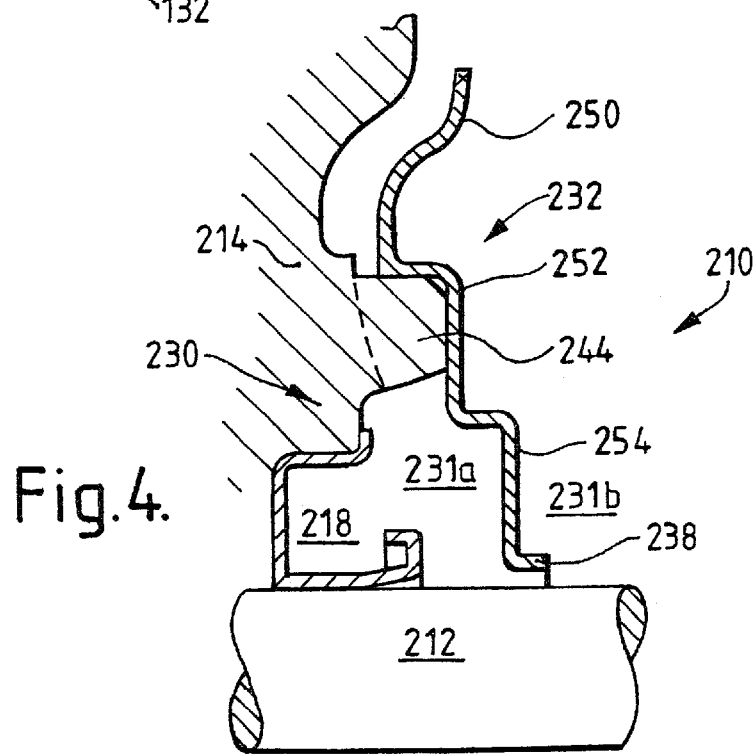

PUMPS

FIELD OF THE INVENTION

This invention relates to improvements in pumps and in particular but not exclusively to improved performance and reliability of shaft fluid seals as used in impeller pumps.

BACKGROUND OF THE INVENTION

In the field of impeller pumps which incorporate a single impeller on an overhung shaft, the shaft seal is often provided with a suitably shaped annular space around it commonly referred to as a seal chamber or balance chamber. One purpose of the seal chamber is to assist in conducting away heat generated by the shaft seal. The seal chamber must be of adequate capacity and of suitable shape to promote a sufficient degree of swirling to enable a necessary proportion of the heat generated by the shaft seal to be transferred into the pumped media during the passage of that pumped media from wearing ring to impeller balance holes.

Sometimes the swirling action in the seal chamber is assisted by a duct or multiplicity of ducts which permit a portion of the outlet pumped media to be directed into the seal chamber in a manner conducive to the cooling of the shaft seal. Typically the ducts may be drillings or pairs of drillings each of which also may need to be tapped or plugged, or one or more external tubes or pipes to pipe connectors which require drilling and tapping and may be also plugging. The ducted pumped media is typically circulated back to the main pumped flow through conventional impeller balance holes.

However, many impeller pumps are called upon to be axially compact. As such there may be insufficient space for an effectively proportioned seal chamber. Also there may be insufficient space for wearing rings or, alternatively, no wearing rings may be fitted as a cost saving.

In such arrangements it is thought that fluid circulation is impeded because the whole mass of fluid between the impeller and pump head tends to rotate as a whole in the manner associated with a liquid annular seal. The resulting pressure differential available across each of the impeller balance holes is insufficient to promote the flow rate which is required for adequate shaft seal cooling.

Accordingly, the present invention seeks to avoid or at least mitigate certain problems in the prior art including the lack of cooling of the shaft seal in, for example, an axially reduced pump arrangement. One object of the invention is to increase fluid recirculation back into the main flow path of the pump thereby to effect cooling and/or recirculation of fluid in the region of the shaft seal.

SUMMARY OF THE INVENTION

One aspect of the present invention provides a fluid pump comprising a body housing a fluid pumping chamber having a rotatable pumping member, a drive shaft which passes through an aperture in the body into the pumping chamber to effect rotation of the pumping member in use, and a seal between the pump body and rotary shaft to inhibit fluid moving along the shaft out of the pumping chamber, characterised by a dividing shroud operably located between the seal and the rotatable pumping member to divide the seal chamber between the seal and the rotary pumping member. Preferably, the dividing shroud is stationary in use.

Beneficially, the dividing shroud is found to increase circulation of the pump fluid, especially around the seal.

Preferably, fluid inlet into the first portion of the divided seal chamber, which first portion is adjacent the seal, is provided. Beneficially, a pressure gradient exists across the fluid inlet, and indeed across the whole first portion of the divided seal chamber, thereby to effect fluid flow into the first portion of the seal chamber.

Preferably, the dividing shroud comprises a central aperture which operably surrounds the rotatable shaft in use. Preferably, the radius of the aperture is slightly greater than the radius of the shaft thereby to provide a fluid passageway between the first and second divided portions of the seal chamber. Preferably, the circular rim of the central aperture can comprise a lip. The lip can extend axially along the rotatable shaft. Preferably, the lip extends away from the seal.

Preferably, means for attaching the dividing shroud to the pump body are provided. For example, the shroud can comprise one or more apertures to enable co-operating locking means such as a threaded bolt and threaded sockets in the pump body to be used to attach the shroud to the pump body. Of course, threaded bolts can protrude from the pump body and nuts can be used to fasten the shroud onto the pump body in this reverse configuration.

The dividing shroud can comprise an attachment or retaining device for co-operating with part of the pump body. For example, the shroud can comprise an annular resilient clip which engages a lip on the pump body thereby to provide a mechanical/frictional attachment.

The fluid inlet to the first portion can comprise a series of fluid passageways in the pump body around the dividing shroud. For example, a series of passageways can be provided between a series of bosses, castellations, or crenallations in the pump body itself.

Another aspect of the invention provides a dividing shroud for a seal chamber of pump. Another aspect provides a flow or recirculation enhancer for increasing recirculation of the fluid or pumped medium past a shaft seal in a pump back into the main flow path between pump inlet and outlet. A further aspect provides a pressure enhancer for increasing fluid pressure in the vicinity of the seal, preferably taking it close to the fluid outlet pressure for the pump.

A yet further aspect of the invention provides a fluid pump comprising a body housing a fluid pumping chamber having a rotatable pumping member, a drive shaft which passes through an aperture in the body into the pumping chamber to effect rotation of the pumping member in use, and a seal between the pump body and rotary shaft to inhibit fluid moving along the shaft out of the pumping chamber, wherein the fluid pumping chamber comprises a seal chamber defined at least in part by the seal and the rotatable pumping member and wherein the pump further comprises means locatable within the seal chamber for effecting circulation of fluid over the seal and back into the main fluid pumping chamber in use.

DESCRIPTION

Embodiments of the invention will now be described, by way of example only, with reference to the accompanying drawings, in which:

FIG. 3 is a schematic perspective view of part of the pump shown in FIG. 2 viewed from the right hand side of FIG. 2;

FIG. 4 is a schematic sectional side elevation view of part of a pump according to a third embodiment of the invention;

DETAILED DESCRIPTION OF PREFERRED EMBODIMENTS

Figure 1:
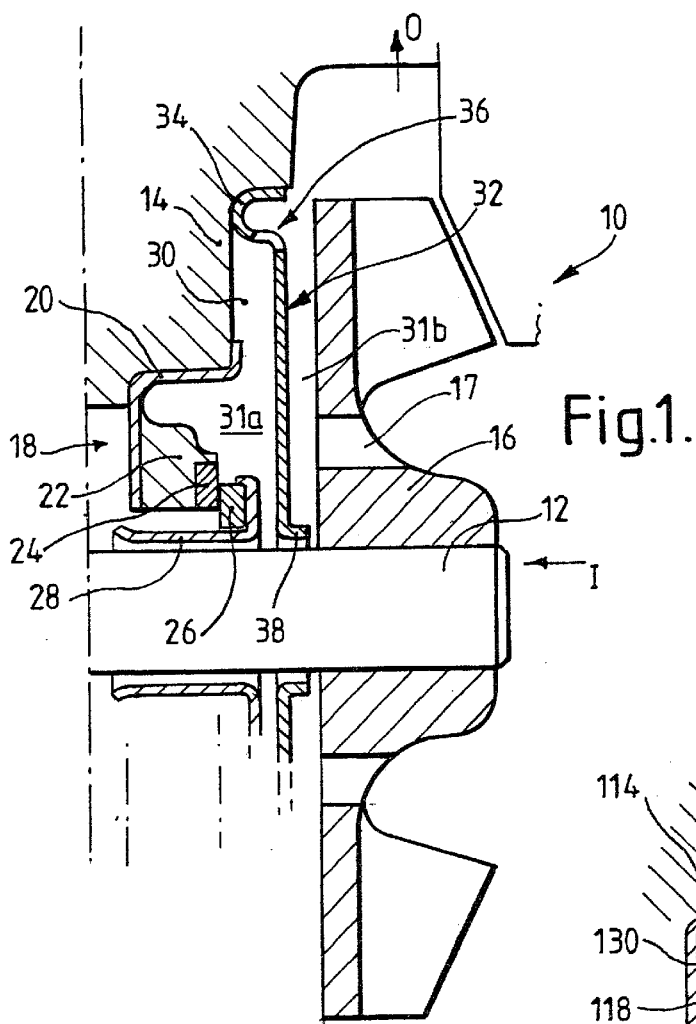
FIG. 1 is a schematic sectional side elevation view of a first embodiment of part of a pump according to the invention.

Referring to FIG. 1 there is shown part of a pump 10 according to the invention comprising a rotatable shaft 12, a pump body 14 and an impeller 16. Impeller 16 comprises a series of blades for effecting fluid flow along the axial direction indicated by arrow I through to a radial outlet direction indicated by arrow 0.

Pump 10 comprises a seal 18 comprising an annular stepped clip 20 for engaging part of the pump body 14 adjacent the central aperture for shaft 12. Clip 20 carries an annulus 22 having a seat portion 24 for engaging and co-operating with a second seat portion 26 which in turn is attached to a sleeve 28 which is located to effect abutment between seats 24 and 26 in a rotationally fast position on shaft 12.

Pump 10 further comprises a dividing shroud 32 which is substantially disk shaped, having a radially outer cup portion 34 for gripping part of pump body 14 and a central aperture through shaft 12, which aperture is defined by a lip 38 which extends axially along shaft 12 away from seal 18. Shroud 32 further comprises a series of apertures 36 in a radial outer position.

Shroud 32 divides the seal chamber 30O forming part of the pumping chamber within pump 10, which seal chamber 30 is defined by seal 18 and part of the pump body 14 as well as the face of impeller 16. Shroud 32 acts to divide the seal chamber 30 into a first portion 31 a adjacent seal 18 and a second portion 31b which in this embodiment is between shroud 32 and impeller 16.

In use, shaft 12 is caused to rotate thereby to effect rotation of impeller 16 thereby causing fluid flow along the direction of arrow I into pump 10 and out along the direction of arrow 0. Shaft 12 further effects rotation of sleeve 28 and annular rotational seat 26. The frictional contact between seats 24 and 26 causes heating of the seal. The pumped media between the impeller 16 and stationary stepped annular disc or shroud 32 typically will rotate at approximately half the impeller speed thereby effecting a radial pressure imbalance between the impeller periphery and the shaft seal. No such pressure imbalance is generated between the stationary pump head 14 and shroud 32. A circulation of fluid consisting of a substantially radial inward flow between the stationary pump head 14 and shroud 32 and a radially outwardly spiralling fluid movement between shroud 32 and the rotating impeller 16 is thus promoted by the impeller thereby enhancing the cooling of the shaft seal 18.

Hence, in accordance with the present invention, impeller 16 increases fluid flows past seal 18 along a path through apertures 36 in shroud 32 down to shaft 12 via the portion 31a of chamber 30 between shroud 32 and seal 18 thereby to effect some cooling of seal 18. The fluid is further recirculated back into the second portion of the seal chamber between shroud 32 and impeller 16 via the annulus between lip 38 on shroud 32 and shaft 12. The fluid is then drawn up towards outlet arrow 0 between shroud 32 and impeller. 16 and or drawn through the axial bores or balance holes 17 in impeller 16. Accordingly, shroud 32 acts to divide chamber 30 and disrupts the otherwise isolated movement of fluid within chamber 30, and effects recirculation of fluid about seal 18 thereby to provide better cooling of the seal.

Moreover, in impeller pumps where the fluid pressure at the pump inlet is close to the vapour pressure of the pumped medium, it is preferable that the pressure in the seal chamber should be maintained at a level sufficiently remote from the vapour pressure to prevent the pumped medium from boiling and, in the case of coolant pumps in the I.C. engine field, to prevent the well-known phenomenon of filming of the shaft seal surfaces from occurring which leads to coolant leakage.

In prior art pump arrangements, the pressure of the pumped medium in the seal chamber 30 can be close to the low pump inlet pressure and if the inlet pressure is close to the vapour pressure of the pumped medium then the additional heat generated by the shaft seal 18 may cause the pumped medium to boil at the seal and/or advance the rate of filming at the shaft seal mating surfaces as just described.

In the arrangement of the present invention, the fluid pressure in portion 31a of seal chamber 30 is raised to be closer to the higher outlet pressure and hence shroud 32 helps to mitigate the problems in the prior art arrangement by reducing the possibility of boiling and/or filming at the seal 18. This effect is enhanced by ensuring a small running clearance between the internal diameter of lip 38 and shaft 12, and by arranging a series of apertures or slots 36 in the shroud 32 near to the outlet of the pump. Accordingly, the seal chamber pressure self adjusts to a value appreciably closer to the pressure at the impeller periphery than to the pump inlet pressure thereby reducing the possibility of the shaft seal to film over and leak.

Figure 2:
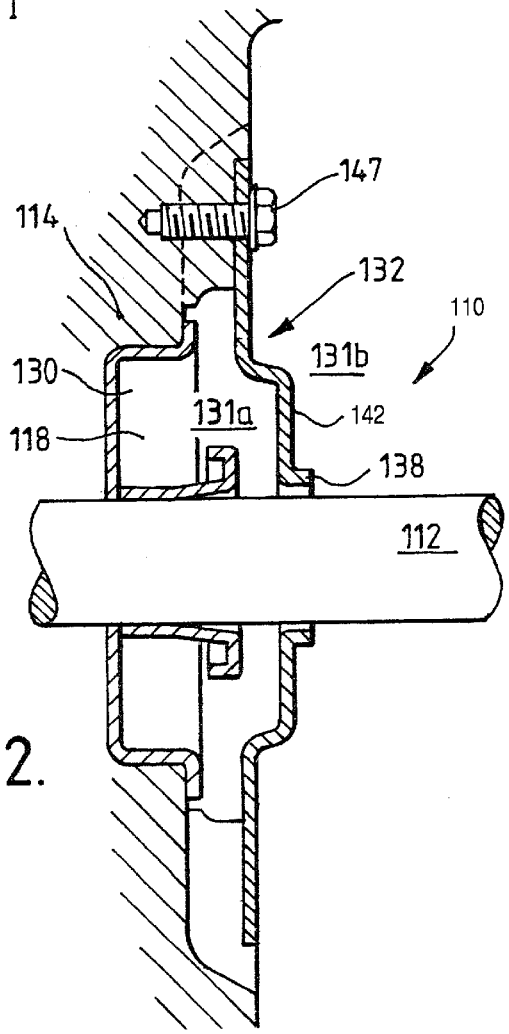
FIG. 2 is a schematic side elevation view of part of a second embodiment of a pump according to the invention.

In another embodiment of the invention, a pump 110 is provided as shown in part in FIGS. 2 and 3. In this embodiment, components having identical or like functions to those shown in the first embodiment are given the same two digit reference number prefixed with the number 1. Accordingly, pump 110 comprises a shaft 112, pump body 114 and seal 118. Shroud 132 comprises a inner stepped annulus 142 which extends down to rim 138. The shroud 132 further comprises a series of apertures 140 for receiving bolts 147. Referring in particular to FIG. 3, it can be seen that the pump body 114 in this embodiment comprises fluid communication passageways which lead into seal chamber 130 and in particular portion 131a. In this embodiment, the fluid communication passageways comprise slots 148 between the series of bosses, castellations or crenallations 144. The castellations 144 each comprise a threaded bore 146 for co-operating with bolts 147 thereby to locate shroud 132 in plate.

It should be noted that shroud 132 shown in FIG. 3 differs slightly from that shown in FIG. 2 in that stepped inner annular portion 142 is not shown. Beneficially, stepped portion 142 increases the size of the first portion of cavity 130 adjacent seal 118 thereby enabling greater fluid movement in the vicinity of the seal.

Of course, the nature and number of fluid passageways, in this embodiment slots 148 can be varied. Similarly, the number of castellations 144 can be varied such that any number can be provided and not just the four shown in the present embodiment.

Referring to FIG. 4, there is shown part of a third embodiment of a pump 210 according to the invention. Here, like components with the earlier embodiments are given the same two digit reference number prefixed with the number 2. Accordingly, pump 210 comprises a shaft 212, pump body 214, seal 218 and seal chamber 230. A dividing shroud 232 is provided which engages a series of castellations 244 at an intermediate radial position. In this embodiment, shroud 232 comprises a radially outer curved portion 250 for guiding fluid down towards castellations 244. Shroud 232 further comprises an annular stepped portion 252 which grips the radially outer surfaces of castellations 244 thereby to fix the shroud 232 in position. Of course, further mechanical attachment devices can be used such as a nut and bolt arrangement as shown in the previous embodiment. Shroud 232 further comprises an inner stepped annulus 254 and finally a lip 238. Accordingly, stepped annulus 252 acts to secure the shroud 232 in position whilst stepped annulus 254 acts to increase the area around seal 218.

Figure 5:
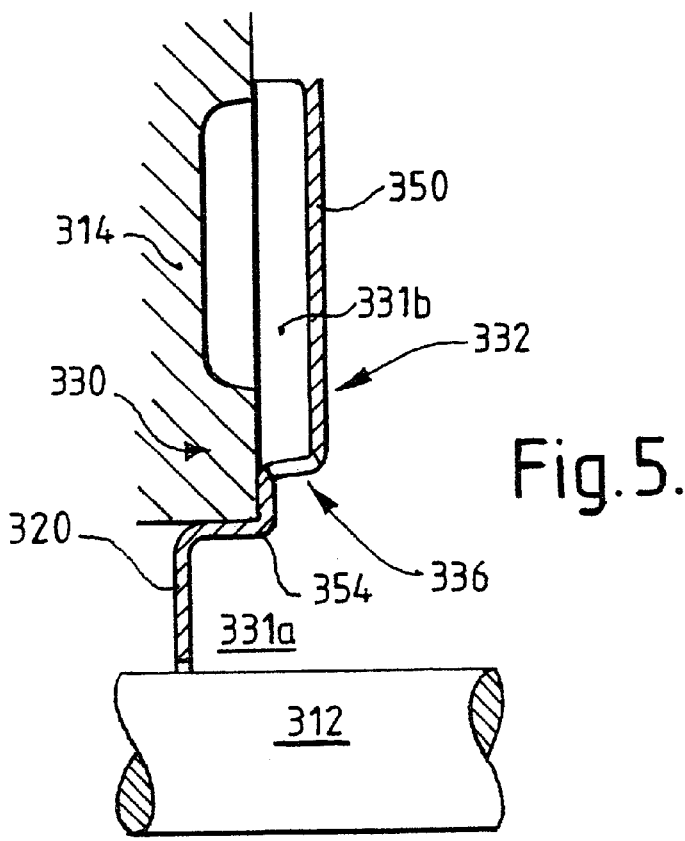
FIG. 5 is a schematic side elevation view of a fourth embodiment.

A yet further embodiment of the invention is shown in part in FIG. 5 wherein a shroud 332 comprises a radially outer portion 350 for guiding fluid between shroud 332 and pump body 314 down towards apertures 336 in the shroud. Here, like components with earlier embodiments are given the same two digit reference number prefixed with the number 3. Shroud 332 comprises a stepped portion 354 which engages part of pump body 314 thereby to locate the shroud in position. In this embodiment, shroud 332 further carries annulus 320 which forms part of the seal 318 (not shown). Accordingly, annulus carries a further annulus 322 (not shown) and stationary circular seat 324 (not shown). Beneficially, shroud 332 acts, in particular through outer portion 350, to increase fluid flow down towards shaft 312 through apertures 336 thereby to effect cooling of the seal.

Figure 6:
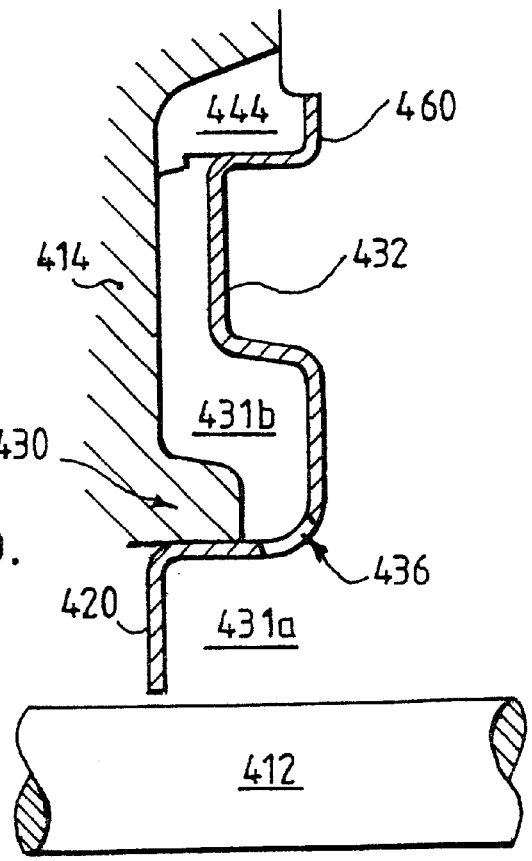
FIG. 6 is a schematic side elevation view of part of a fifth embodiment of the invention.

In a further embodiment of the invention shown in FIG. 6, a shroud 432 comprises a stepped radially outer portion 460 for engaging crenallations in the pump body 414. The S-shaped central portion of shroud 432 extends from stepped portion 460 to apertures 436 which can be provided in a circular series around the shroud 432. Accordingly, the central portion of shroud 436 acts to guide fluid between slots located between the series of bosses or castellations 444 in the pump and the apertures 436. Shroud 432 further comprises an inner annular clip 420 for engaging part of pump body 414. Annulus 420 forms part of a seal 418 (not shown), and therefore carries a further annulus and seat for engaging the rotatable part of the seal as shown in earlier embodiments.

What we claim is:

1. A fluid pump comprising a pump body housing a fluid pumping chamber having a rotatable pumping member, a drive shaft which passes through an aperture in the pump body into the pumping chamber to effect rotation of the pumping member in use, and a seal between the pump body and drive shaft to inhibit fluid moving along the shaft out of the pumping chamber, characterized by a dividing shroud operably located between the seal and the rotatable pumping member to divide the fluid pumping chamber between the seal and the rotatable pumping member, wherein a fluid inlet is provided into a first portion of the divided fluid pumping chamber, which first portion is adjacent the seal and the fluid inlet is at least in part defined by a radially outer portion of the dividing shroud and a portion of the pump body, and wherein the dividing shroud operably creates a pressure gradient across the fluid inlet and first portion of the divided fluid pumping chamber, thereby to effect fluid flow into the first portion.

2. A fluid pump according to claim 1 wherein the dividing shroud is stationary in use.

3. A fluid pump according to claim 1 wherein the dividing shroud comprises an aperture which operably surrounds the drive shaft in use.

4. A fluid pump according to claim 3 wherein the radius of the aperture is slightly greater than the radius of the drive shaft thereby to provide a fluid passageway between the divided portions of the pumping chamber.

5. A fluid pump according to claim 3 wherein the rim of the aperture is circular.

6. A fluid pump according to claim 3 wherein the aperture comprises a protruding lip.

7. A fluid pump according to claim 6 wherein the lip extends co-axially along the drive shaft.

8. A fluid pump according to claim 7 wherein the lip extends away from the seal.

9. A fluid pump according to claim 1 comprising means for attaching the dividing shroud to the pump body.

10. A fluid pump according to claim 9 wherein the shroud comprises an annular resilient clip which engages a lip on the pump body thereby to provide a mechanical/frictional attachment.

11. A fluid pump according to claim 1 comprising a fluid inlet to the first portion having a series of fluid passageways in the pump body around the dividing shroud.

12. A fluid pump according to claim 11 wherein the series of fluid passageways comprises a series of castellations, in the pump body.

13. A fluid pump according to claim 1 comprising flow enhancer for increasing recirculation of fluid, or pumped medium, past a shaft seal in a pump back into a main fluid flow path between a pump inlet and outlet.

14. A fluid pump according to claim 1, wherein the fluid pumping chamber comprises a seal chamber defined at least in part by the seal and the rotatable pumping member and wherein the pump further comprises means locatable within the seal chamber for effecting circulation of fluid over the seal and back into a main fluid pumping chamber in use.

15. A fluid pump comprising a pump body housing a fluid pumping chamber having a rotatable pumping member with a first radius, a drive shaft which passes through an aperture in the pump body into the pumping chamber to effect rotation of the pumping member in use, and a seal between the pump body and drive shaft to inhibit fluid moving along the shaft out of the pumping chamber, characterized by a dividing shroud operably located between the seal and the rotatable pumping member to divide the fluid pumping chamber between the seal and the rotatable pumping member, wherein a fluid inlet is provided into a first portion of the divided fluid pumping chamber, which first portion is adjacent the seal and the fluid inlet is provided at a radially outer portion of the dividing shroud at a second radius substantially equal to the first radius exposing the fluid inlet to substantially the outlet pressure generated by the pump in use, and wherein the dividing shroud operably creates a pressure gradient across the fluid inlet and first portion of the divided fluid pumping chamber, thereby to effect fluid flow into the first portion.

16. A fluid pump according to claim 15 wherein the dividing shroud comprises an aperture which operably surrounds the drive shaft in use.

17. A fluid pump according to claim 16 wherein the radius of the aperture is slightly greater than the radius of the drive shaft thereby to provide a fluid passageway between the divided portions of the pumping chamber.

18. A fluid pump according to claim 16 wherein the aperture comprises a protruding lip.

19. A fluid pump according to claim 18 wherein the lip extends co-axially along the drive shaft.

20. A fluid pump according to claim 19 wherein the lip extends away from the seal.

21. A fluid pump according to claim 15 comprising means for attaching the dividing shroud to the pump body.

22. A fluid pump according to claim 21 wherein the shroud comprises an annular resilient clip which engages a lip on the pump body thereby to provide a mechanical/frictional attachment.

* * * * *